United States Patent [19]
Whittaker

[11] Patent Number: 5,063,709
[45] Date of Patent: Nov. 12, 1991

[54] "V" TRELLIS SUPPORT DEVICE

[76] Inventor: Howard E. Whittaker, 184 Missouri Flat Rd., Grants Pass, Oreg. 97527

[21] Appl. No.: 600,854

[22] Filed: Oct. 22, 1990

[51] Int. Cl.⁵ .............................................. A01G 17/06
[52] U.S. Cl. .......................................... 47/46; 52/658
[58] Field of Search ............................... 47/46; 52/658

[56] References Cited

U.S. PATENT DOCUMENTS

| 3,139,161 | 6/1964 | Simon | 52/658 |
| 4,023,307 | 5/1977 | Clark et al. | 47/46 |
| 4,738,051 | 4/1988 | Dyson | 47/46 |

FOREIGN PATENT DOCUMENTS

| 335476 | 2/1959 | Switzerland | 47/46 |

OTHER PUBLICATIONS

European patent application 0145353 Jun. 1985.

Primary Examiner—David A. Scherbel
Assistant Examiner—Joanne C. Downs
Attorney, Agent, or Firm—Neil J. Driscoll

[57] ABSTRACT

The trellis support device consists of elongated arm members joined and secured permanently together by a horizontal cross member. The lower central point of the V-shaped arm members and the cross member each employ U-bolts to be fastened to existing wood or metal grape stakes of conventional design. Arm members and cross member have slots in the distal end of each member to receive tension wires of the trellis system.

1 Claim, 2 Drawing Sheets

"V" TRELLIS SUPPORT DEVICE

FIELD OF THE INVENTION

This invention relates to a plant support system. More particularly, it relates to an improved, vertical V-shaped metal trellis support device for supporting grape plants in such a manner as to provide for maximum sunlight exposure through efficiently managed canopies.

DESCRIPTION OF THE PRIOR ART

Grapes are usually grown on tensioned wire trellises. In the past, most trellises were of the same general type and consisted of wooden cross arms nailed to the upper ends of wooden stakes firmly set into the ground. The grape stakes are generally spaced evenly apart and arranged in rows which extend between the boundaries in the vineyard in a direction such that the proper exposure is insured for each curtain of grape vine foliage growing thereon Said foliage is supported by tensioned wires running horizontally along one or both sides of the line of grape stakes, and the wires are generally affixed by nails or stapled to the ends of the wooden cross arms.

It is realized that wooden cross members or trellis systems are much less ideal because of installation practices and the limited lifetime thereof under exterior use conditions. These same members are not capable of supporting a particularly great load on their arms, and because the stake and cross piece are normally held together by nails or staples, there is a tendency for the wood of either piece to split or become damaged, either during the installation or during the stress of the vine. This is further aggravated with the aging and weathering of the wood.

The vine canopy can be arranged either horizontally (as is commonly done on the afore-mentioned standard wooden cross arms) or vertically as is accomplished by some of the more modern day trellis systems. In cooler viticulture areas, more leaves are necessary to ripen a given amount of grapes than in warmer climates. In trellis systems of the past, the two outside wires supporting the grape vine could not efficiently manage the canopy in a fashion leading to optimum sunlight exposure of foliage and fruit. Intensive canopy management successfully exposes more leaves to sunlight, thereby promoting respiration of malic acid (lowering the total acidity of the picked grape). A tall, narrow (vertical) canopy also insures better penetration of spray materials for disease control and allows grape clusters to be more exposed and better distributed, easing the burden of harvest by being situated free from the canopy. The vertical trellis system (as ideally accomplished with the current invention) distributes the fruiting wood (cane or cordon) continuously along wires at the bottom of the canopy. As the shoots grow vertically from the renewal buds located on the cane or cordon, they are supported by the upper catch wires thereby promoting improved distribution and avoiding crowding and shading. This even distribution of shoots and leaves in the canopy is ideally accomplished with a trellis system of new design and improved features.

This invention, then, seeks to overcome some of the aforementioned problems inherent with the use of wooden cross arms, providing V-shaped cross arms of galvanized steel of rigid unitized construction employing ease of fabrication, installation, pruning and harvesting.

SUMMARY OF THE INVENTION

One feature of the invention includes two or more sets of slots punched through the distal ends of the top of the V-shaped arm members and the distal ends of the cross member. The lower slots are utilized to support the cane or cordon wires and the upper slots are utilized to support the canopy or catch wires. The design is inherently flexible to allow additional slots for optional use for inner support wires if needed in intensive canopy arrangement. The slots readily accept longitudinal tensioned wires without need to thread wires through holes and once in place are easily secured by simply bending over the end of the arm member.

A second feature of the invention relates to fabrication whereby only two pieces of galvanized angle iron are required with prepunched slots for wires and holes for rivets and U-bolts (or similar fasteners), leading to ease of assembly and installation. In addition, a pre-cut "V" in one side of the long member used to form the V-member arms allows for a simple bend of the arm in half while maintaining integrity of the entire piece, thus adding strength.

A third feature of the invention employs two pieces of hardware, namely two sets of U-bolts (or substantially similar hardware) of sufficient length to accomodate various dimension stakes. The U-bolts are passed through the bottom of the V-member and middle of the cross member and readily tightened and secured with nuts around the existing stake. The simple installation provides a strong assembly with a rigid two-point connection to the stake.

A fourth feature of the invention is entire assembly requires only two stainless steel pop rivets ( or substantially similar hardware) connecting the cross arm member permanently to the V-shaped member.

A fifth feature of the invention imparts ease of installation, requiring only two tools--pliers or similar tool to bend tabs on the ends of the arms over the slots and a socket wrench for tightening the nuts on the U-bolts.

A sixth feature of the invention is the strength of the completed assembly. Because of the 90' angle ( or similar angle) of the upwardly pointed V-shaped arm member coupled with the permanently riveted connection to the cross member, the assembly is inherently rigid to sufficiently support considerable weight of trellis wires without having a tendency to twist or collapse.

These and other features of the invention will become apparent from a review of the following specifications and drawings.

BRIEF DESCRIPTION OF THE INVENTION

Figure 1:
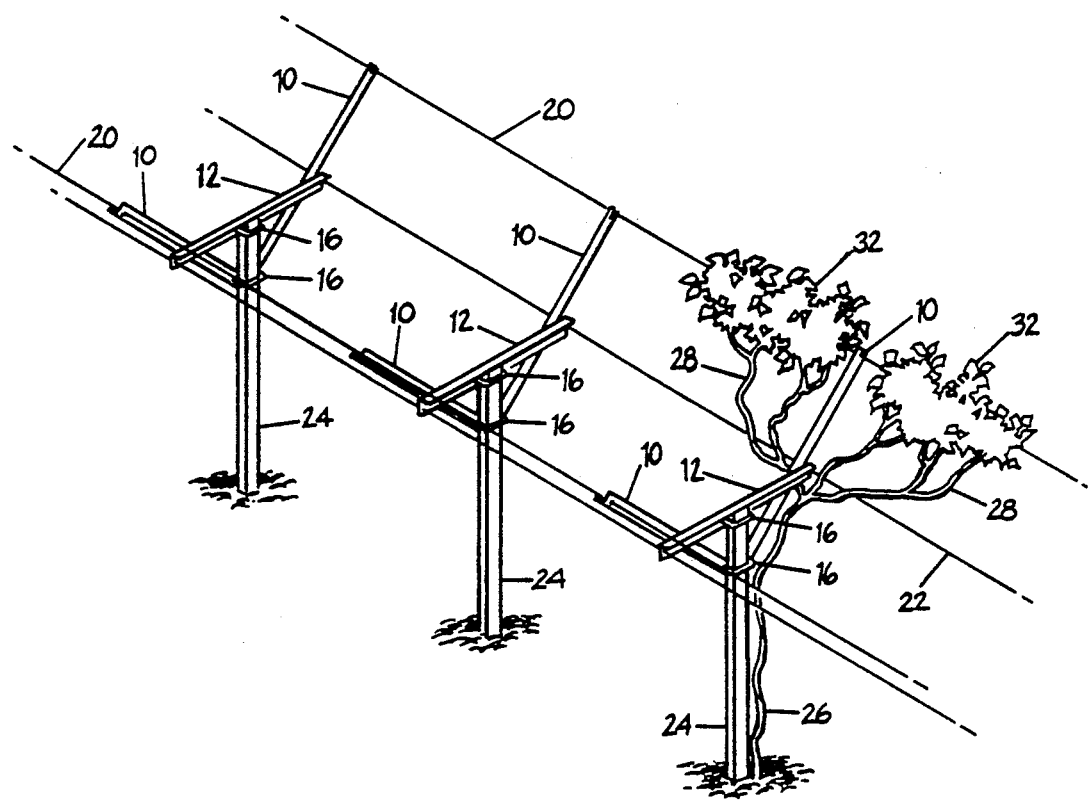
FIG. 1 is an isometric view of a "V" trellis support system incorporating the invention.

FIG. 1 shows a side elevation of a plurity of "V" shaped trellis support devices mounted over standard wooden or metal grape stakes 24. The grape plant 26 grows vertically along the stake and is trained into canes or cordons 28,28 which are in turn supported along the lower set of tensioned wires 22. Shoots of the vine are trained upward to form the canopy 32 which is supported by the upper set of tensioned wires 20.

In FIG. 1 the "V" trellis support device is shown mounted on standard grape stakes 24 and includes two primary angle iron elements, 40 and 50, permanently secured together. Angle iron 40 has one wall, 41 "V" slotted, as at 43, is folded in the middle at or substantially near a 90' angle to form two upwardly designated trellis arm supports 10, in effect, the "V" portion of the device. A second piece of angle iron designated the cross member 50 is connected at a horizontal plane relative to the ground to the "V" shaped vertical arm members 10 at two points with stainless steel pop rivets 52,52 or substantially similar fasteners.

Figure 2:
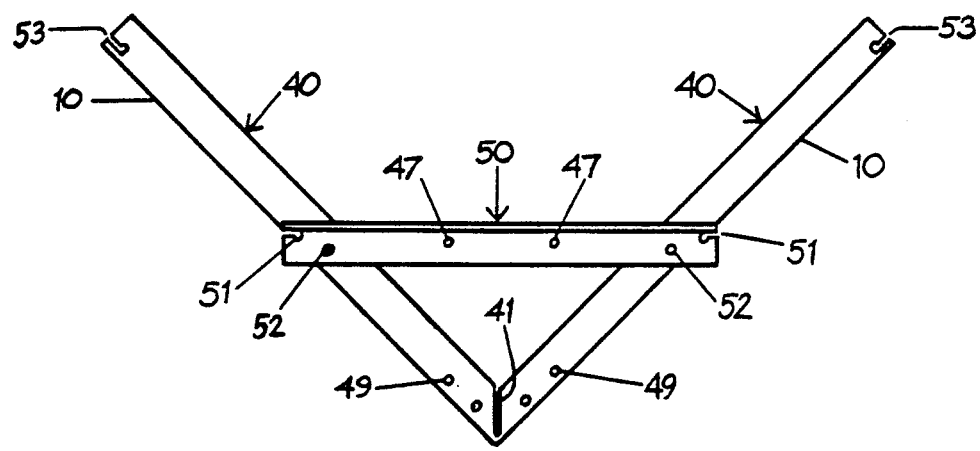
FIG. 2 is a side elevational view of a "V" trellis device in a first opened position.
Figure 3:
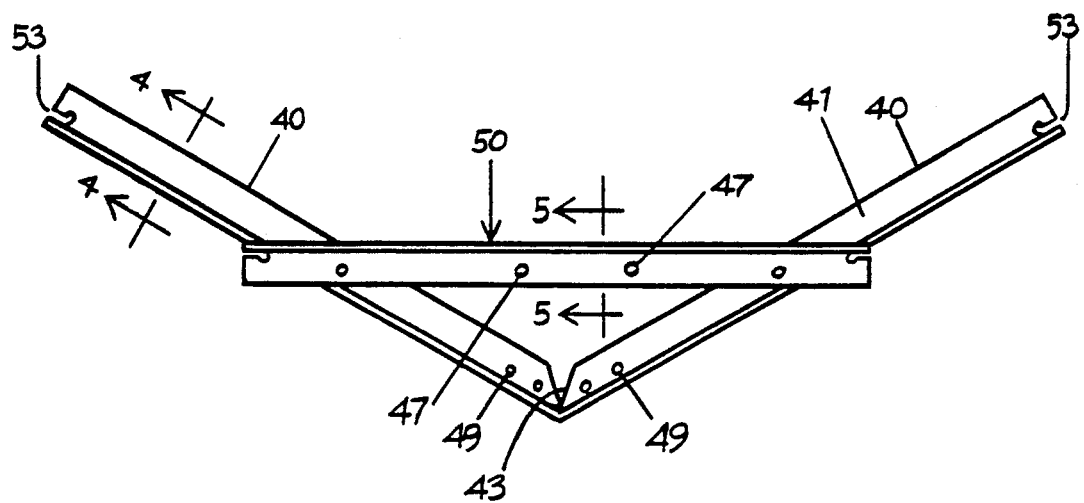
FIG. 3 is a "V" trellis support device illustrating a second open position.
Figure 4:
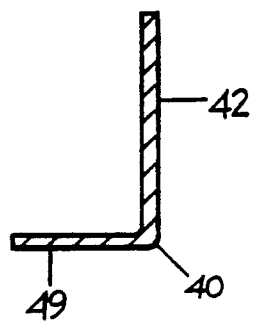
FIGS. 4 & 5 are sectioned views taken along lines 4—4 and 5—5 of FIG. 3.
Figure 5:
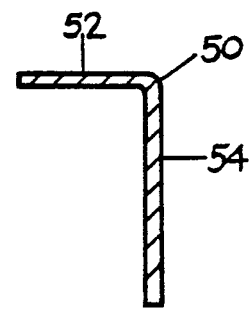

An additional feature of the assembled device in FIGS. 2 and 3 the cross member's horizontal plane 52 which forms a stop for engagement with the upper end of the grape stake 24 to stably mount the cross arm unit on the stake.

At each end of the "V" shaped arm members 10,10 and likewise the ends of the cross member 50 is a slot 53 fashioned in such a way as to readily accept the tensioned trellis wires 20,22 and commonly designed in such a way as to enable the installer to close the slot over the wire by a simple procedure of bending over the end portion of the arm member, thus securing the wire into the slot.

Referring to FIG. 1, U-bolt assemblies 16,16 are shown mounted on holes 49,49 in both the lower elevation of the "V" shaped vertical arm members 10 and the center portion of the cross member 50.

The U-bolt assembly offers a simple and rigid mounting of the trellis.

Directing attention to FIGS. 2 through 5 inclusive. The number 40 indicates the "V" shaped vertical arm members which form the basis for the trellis. A cross member is shown at 50 and it is rigidly connected to the arm members 40,40 by the rivets 52,52.

Note that the cross member 50 employed in FIG. 3 is longer than the member 50 utilized in FIG. 2. This feature allows the transverse horizonal dimension of the trellis to be varied and accommodating the carriage of more grape vines. The arm members and the cross member are again provided with end slots as shown 53,53 at 51 where the vine supporting wires may be carried. The strength and rigidity of this structure is apparent.

It will be appreciated that while the present invention has been shown and described with respect to particular preferred embodiment, variations and modifications are possible within a range of equivalents without sacrificing advantages of the invention or departing from the true spirit and scope of the inventive concepts set forth herein.

I claim:

1. In a trellis arrangement for supporting vine-like growing plants, the combination of
    a supporting stake adapted to be driven into the ground,
    metallic arm members having inner and outer ends secured to the stake,
    said arm members forming a V as seen in side elevation,
    a cross member having outer ends, said cross member been arranged horizontally and extending between the arm members,
    wire receiving slots formed in the outer ends of the arm members and cross member,
    said arm members being physically joined at the inner ends thereof as seen in side elevational view,
    said physical joinder accommodating arcuate movement of the respective arms about the locale of physical joinder to allow the width of the trellis arrangement to be reduced or increased,
    means for securing the outer ends of the cross member to the respective arm members,
    the width of the trellis arrangement being variable depending upon the length of the cross member employed in the arrangement.

* * * * *